(12) United States Patent
Xiao et al.

(10) Patent No.: US 11,571,697 B2
(45) Date of Patent: Feb. 7, 2023

(54) SAMPLING AND SENSING DEVICE AND METHOD OF USE THEREOF

(71) Applicants: Bo Xiao, Virginia Beach, VA (US); Xiaoyue Du, Chengdu (CN)

(72) Inventors: Bo Xiao, Virginia Beach, VA (US); Xiaoyue Du, Chengdu (CN)

( * ) Notice: Subject to any disclaimer, the term of this patent is extended or adjusted under 35 U.S.C. 154(b) by 383 days.

(21) Appl. No.: 16/677,518

(22) Filed: Nov. 7, 2019

(65) Prior Publication Data
US 2021/0138455 A1 May 13, 2021

(51) Int. Cl.
*B01L 3/00* (2006.01)
*G01N 1/10* (2006.01)

(52) U.S. Cl.
CPC .............. *B01L 3/5055* (2013.01); *G01N 1/10* (2013.01); *B01L 2200/10* (2013.01); *B01L 2300/069* (2013.01); *B01L 2300/0663* (2013.01)

(58) Field of Classification Search
None
See application file for complete search history.

(56) References Cited

U.S. PATENT DOCUMENTS

| | | | | |
|---|---|---|---|---|
| 5,345,809 A * | 9/1994 | Corrigan | ............ | G01N 1/2214 250/288 |
| 5,597,532 A * | 1/1997 | Connolly | ............ | B01L 3/545 436/66 |
| 5,747,351 A * | 5/1998 | Hemmati | ............ | G01N 33/558 435/7.1 |
| 6,165,416 A * | 12/2000 | Chandler | ............ | G01N 33/726 436/178 |
| 6,326,214 B1 * | 12/2001 | Liu | ............ | G01N 33/54366 435/287.7 |
| 7,549,323 B2 * | 6/2009 | Charlton | ............ | G01N 33/528 422/68.1 |
| 7,587,793 B2 * | 9/2009 | Sangha | ............ | A61B 90/96 422/550 |
| 8,747,774 B2 * | 6/2014 | Doyle | ............ | B01L 3/5055 422/402 |
| 9,297,724 B2 * | 3/2016 | Chen | ............ | G01N 1/10 |
| 2003/0175993 A1 * | 9/2003 | Toranto | ............ | A61B 10/0051 436/518 |
| 2006/0219938 A1 * | 10/2006 | Huang | ............ | H01J 37/08 250/432 R |
| 2011/0150705 A1 * | 6/2011 | Doyle | ............ | B01L 3/5055 422/82.02 |
| 2012/0310113 A1 * | 12/2012 | Giddings | ............ | A61B 10/0045 600/572 |
| 2016/0136641 A1 * | 5/2016 | Sangha | ............ | B01L 3/5029 422/550 |
| 2017/0143198 A1 * | 5/2017 | Xiao | ............ | A61B 1/247 |
| 2018/0080855 A1 * | 3/2018 | Taylor | ............ | C09J 7/21 |
| 2018/0275054 A1 * | 9/2018 | Umetsu | ............ | B01L 3/508 |

* cited by examiner

*Primary Examiner* — Lore R Jarrett

(57) ABSTRACT

The present disclosure relates to a sampling and sensing device and a method of using the sampling and sensing device for collecting and sensing chemical or biological analytes. The sampling and sensing device comprises a handle and a foldable head having a sampling region and a sensing region. A sensor chip may be disposed in the sensing region and a sampling wipe may be disposed in the sensing region. The sampling region is configured to collect an analyte. After the analyte is collected on the sampling region, the sampling and sensing device can be folded to make the sampling region in contact with or face the sensing region to transfer the analyte to the sensing region for analysis.

14 Claims, 6 Drawing Sheets

SAMPLING AND SENSING DEVICE AND METHOD OF USE THEREOF

TECHNICAL FIELD

The present disclosure relates to devices and methods for sampling and sensing chemical or biological samples, and in particular, to a sampling and sensing device having a sampling wipe for collecting and transferring chemical or biological analytes and a sensor chip for analyzing the analytes, and a method of use thereof.

BACKGROUND

Chemical and biological sensors are measurement devices that react to a physical, chemical, or biological property of an analyte and convert such a reaction into a measurable signal. The magnitude and pattern of the signal produced by the sensors can provide information for the identification and analysis of various analytes. A specific substance or structure is typically coated or constructed on the surface of the sensors where analytes contacted with the surface induce a measurable change of its physical, chemical, or biological conditions.

Detecting and analyzing analytes typically involves collecting samples of the analytes, transporting them to a laboratory, and using laboratory instruments for quantitative or qualitative measurements. However, in many situations, it is preferable or necessary to perform detection and analysis on site. The use of chemical and biological sensors is gradually migrating analytic technology from the laboratory environment to the field. These sensors can work alone or with portable field instruments to conduct detection and analysis in homeland security, forensic, environmental, and food safety applications that include identifying explosive or toxic materials, monitoring environmental pollution, identifying contamination specimens of food, and detecting narcotics. With many recent advances, some sensors based on the technology such as surface enhanced Raman spectroscopy (SERS), surface plasmon resonance (SPR) and quartz crystal microbalance (QCM) can be easily integrated with portable and handheld field instruments to achieve more accurate and faster performance than traditional laboratory instruments. For example, SERS is a highly sensitive analytical technique that enables the detection of chemical or biological analytes in trace amount far below the sensitivity limit of the conventional Raman spectroscopy. Most SERS sensors are a flat substrate with micro- or nano-scale structures on their surfaces that amplify Raman scattering signals of analytes adsorbed on rough metal surfaces. The theoretical calculation revealed that the electromagnetic enhancement factor could be up to $\sim 10^{10}$-$10^{12}$, reaching the sensitivity high enough for single molecule detection.

It is nontrivial that analytes are properly collected and applied to the sensor surfaces. Wipe-sampling is a common practice for sample collecting. A user may dissolve wiped analytes in a solution and then transfer the solution onto the sensor surfaces. However, the process involves multiple steps and is inconvenient for field applications.

BRIEF SUMMARY

The present disclosure provides a sampling and sensing device and a method for use in collecting, transferring, and detecting chemical, biological, or biochemical analytes.

One embodiment of the present disclosure is a sampling and sensing device. The sampling and sensing device may include a handle and a foldable head. The foldable head may include a sensing region and a sampling region. After the foldable head is folded, the sensing region and the sampling region may face each other or face away from each other.

Optionally, the sampling and sensing device may further include a sensor chip in the sensing region and a sampling wipe in the sampling region.

Optionally, the sampling and sensing device may further include a folding line on the foldable head between the sensing region and the sampling region. A portion of the foldable head may be folded along the folding line to make the sensing region and the sampling region facing each other or facing away from each other.

Optionally, the sampling region and the sensing region may be on the same side of the foldable head.

Optionally, the sensor chip may be sensitive to at least a change of physical, chemical, or biological properties.

Optionally, an analyte collected in the sampling region may be transferred to the sensing region by folding the foldable head to make the sensing region and the sampling region face each other.

Optionally, an analyte collected in the sampling wipe may be transferred to the sensor chip by folding the foldable head to make the sensing chip and the sampling wipe face each other.

Optionally, a capsule containing a liquid may be disposed under or in the sampling wipe, configured to be breakable in response to pressure.

Optionally, the capsule may release the liquid to wet the sampling wipe after the capsule is ruptured.

Optionally, the sampling wipe may be soaked with ethanol, methanol, propanol, or water.

Optionally, a cap having a through hole or a plurality of through holes may cover the sensor chip.

Optionally, the sampling and sensing device may further include a second handle. The handle and the second handle can be joined together as one handle after the foldable head is folded.

Another embodiment of the present disclosure is a method of using a sampling and sensing device. The method may include:

wiping a surface to collect an analyte onto a sampling region;

folding a portion of a foldable head to make the sampling region in contact with or facing a sensing region;

applying a force on the sampling and sensing device to release the analyte collected on the sampling region to the sensing region.

Optionally, the method may further include, before wiping a surface to collect an analyte onto the sampling region, folding a portion of a foldable head to make the sampling region and the sensor region facing away from each other.

Optionally, the method may further include, before or after wiping a surface to collect an analyte onto the sampling region, breaking a capsule in the sampling region and releasing a liquid in the capsule to wet the sampling region.

Optionally, the method may further include, during applying the force to the sampling and sensing device to release the analyte collected on the sampling region to the sensing region, breaking a capsule in the sampling region and releasing a liquid in the capsule to wet the sampling region.

Optionally, the method may further include, before applying the force to the sampling the sensing device to release the analyte collected on the sampling region to the sensing region, applying a liquid to the sampling region.

BRIEF DESCRIPTION OF THE DRAWINGS

The drawings are intended to provide a further understanding of the technical solutions of the present disclosure, and are intended to be a part of the specification, and are used to explain the technical solutions of the present disclosure, and do not constitute a limitation of the technical solutions of the present disclosure.

DETAILED DESCRIPTION

Figure 1A:
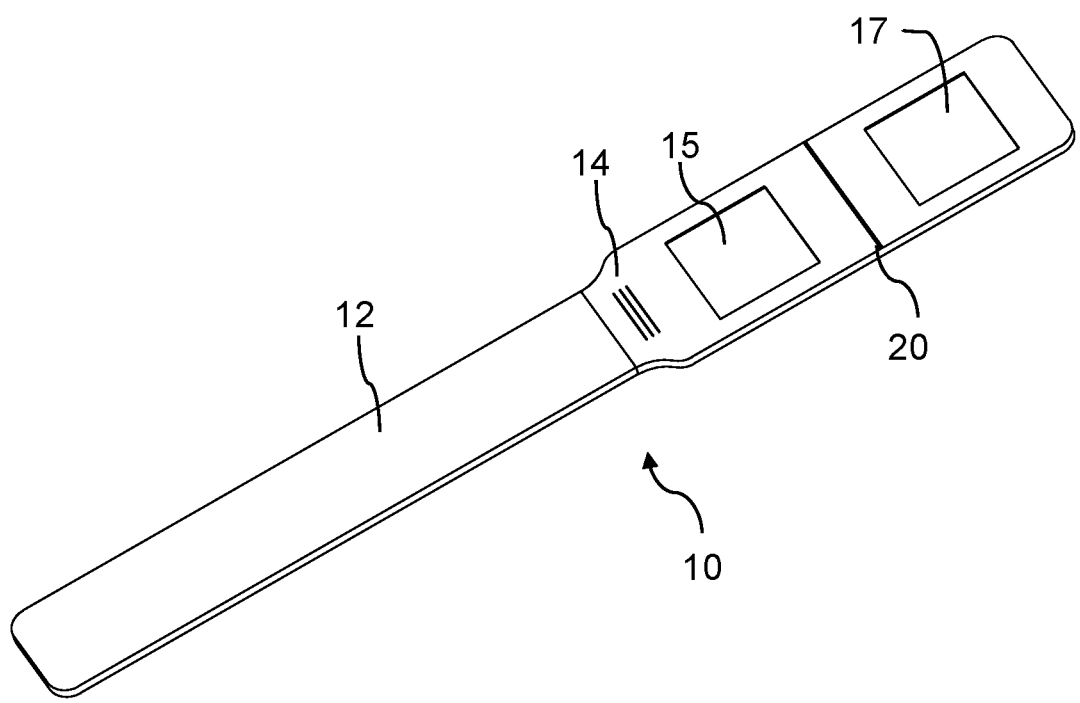
FIG. 1A is a perspective view of a sampling and sensing device having two regions for a sensor chip and a sampling wipe according to one embodiment of the present disclosure.

The present disclosure will be described in further detail with reference to the accompanying drawings and embodiments in order to provide a better understanding by those skilled in the art of the technical solutions of the present disclosure. Throughout the description of the disclosure, reference is made to FIGS. 1-8. When referring to the figures, like structures and elements shown throughout are indicated with like reference numerals. In the description of the following embodiments, specific features, structures, materials, or characteristics may be combined in any suitable manner in any one or more embodiments or examples.

One embodiment of the present disclosure provides a sampling and sensing device. The sampling and sensing device can be used to collect, transferring, and analyzing or sensing chemical or biological samples. As shown in FIG. 1A, the sampling and sensing device includes a handle 12 and a foldable head 14. The foldable head includes a first region 15 and a second region 17. One of the first region and the second region is a sensing region, and the other is a sampling region. That is, the first region 15 is the sensing region, and correspondingly the second region 17 is the sampling region; or the first region 15 is the sampling region, and correspondingly, the second region 17 is the sensing region. In either way, the foldable head can be folded along a folding line 20 to make the sensing region and the sampling region face each other or face away from each other.

Figure 1B:
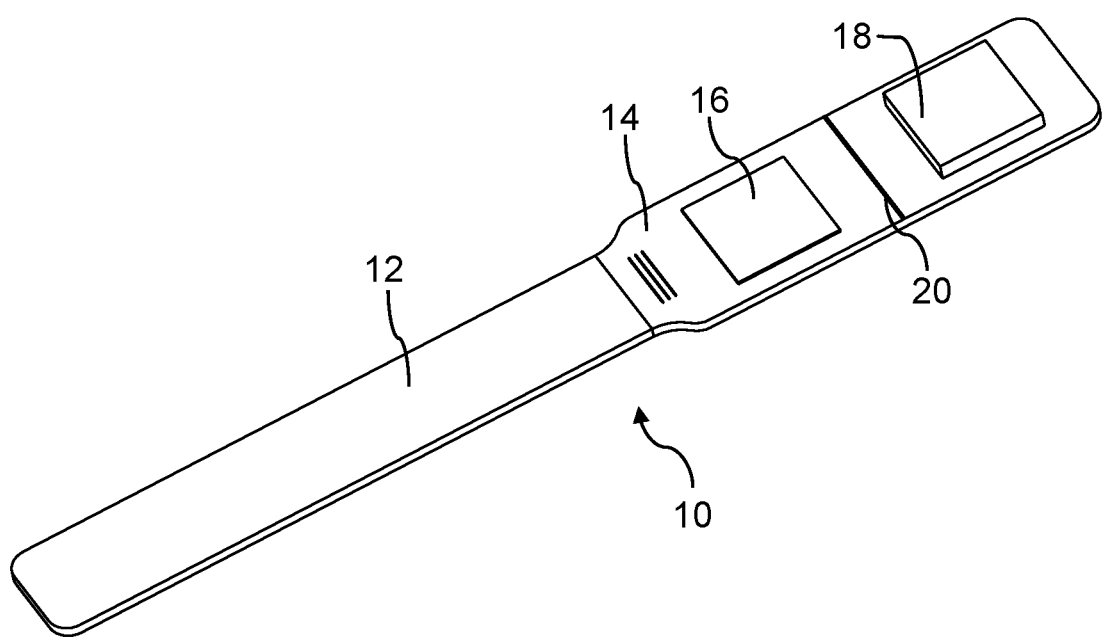
FIG. 1B is a perspective view of a sampling and sensing device having a sensor chip and a sampling wipe according to one embodiment of the present disclosure.

In one embodiment, the sampling and sensing device further includes a sensor chip 16 and a sampling wipe 18. The sampling wipe can be used to collect or sample chemical or biological analytes that then can be transferred onto the sensor chip. Here, for easy reference, the sensor chip 16 is disposed in the first region 15 and the sampling wipe 18 is disposed in the second region 17. FIG. 1B illustrates the sampling and sensing device 10 having a sensor chip 16 and a sampling wipe 18. The first region 15 and the second region 17 are the same in FIGS. 1A and 1B. The sampling and sensing device includes a handle 12, a foldable head 14, a sensor chip 16, and a sampling wipe 18. The sensor chip 16 and the sampling wipe 18 are placed on the foldable head 14. Before the foldable head is folded, the sensor chip 16 and the sampling wipe 18 at the same side of the foldable head 14. The folding line 20 is located on the foldable head 14 at a location between the sensor chip 16 and the sampling wipe 18. The folding line 20 is used to guide the folding of the foldable head 14. The line may be formed by pressing, printing, scoring, or punching. In one embodiment, the handle 12 and the foldable head 14 may be integrally formed using a flexible material, such as polyethylene, polypropylene, polyvinyl chloride, polyamides, and polyesters. In another embodiment, the handle 12 and the foldable head 14 may be formed separately and attached, and the handle 12 may be formed using a rigid material, such as wood, stainless steel, and high-density polyethylene.

Figure 2:
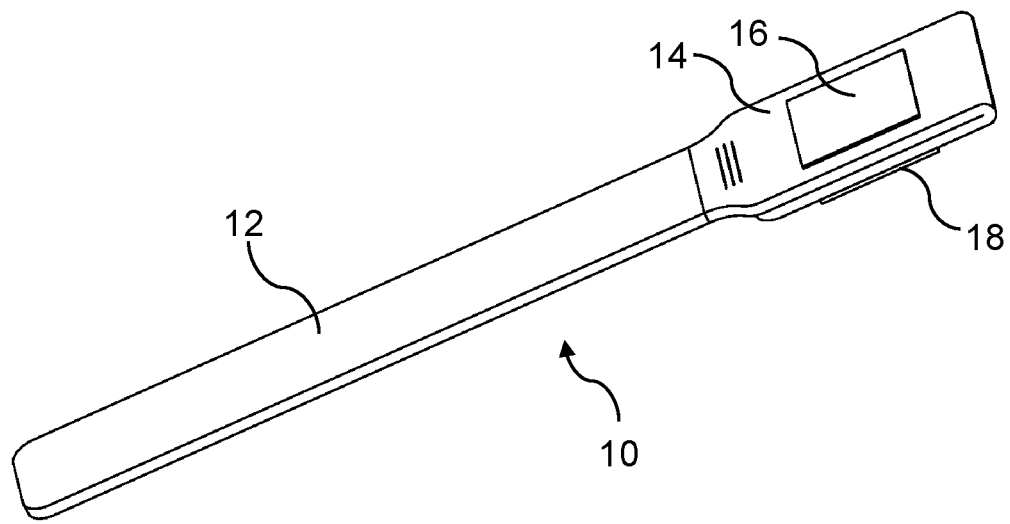
FIG. 2 is a perspective view of a folded sampling and sensing device.
Figure 3:
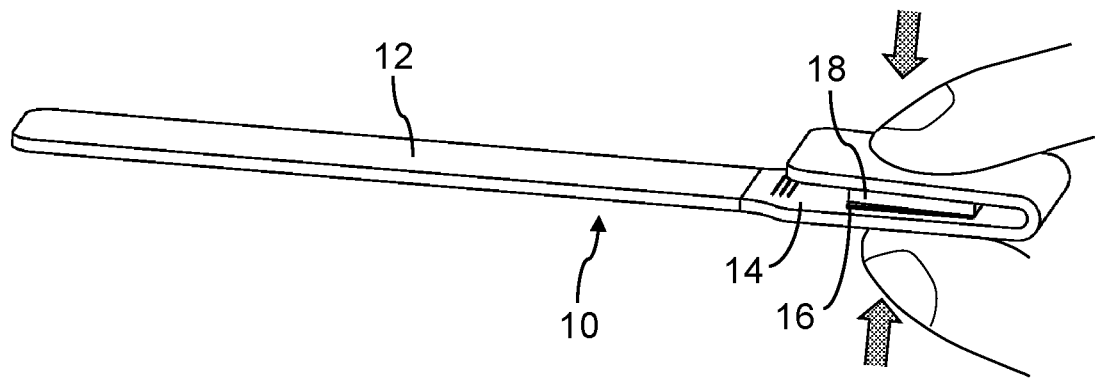
FIG. 3 illustrates a method of using a sampling and sensing device for transferring an analyte.

In one embodiment, as shown in FIGS. 1B, 2 and 3, the sensor chip 16 is a surface sensing device, wherein the surface of the device is sensitive to chemical or biological analytes. Once an analyte is attached on the surface of the sensor chip 16, the analyte changes the chemical or physical properties of the sensor chip 16. The change of the properties may be directly observed or measured to identify or analyze the analyte. The sensor chip may be an SERS sensor, an SPR sensor, a QCM sensor, or the like. The sampling wipe 18 is an absorbent pad or piece of material for use in collecting analytes and transferring them to the surface of the sensor chip 16. The sampling wipe needs to be substantially free of lint and any contaminants that affect the sensitivity of the sensor chip. Woven cotton, polypropylene, polyurethane, and nylon may be used to make the sampling wipe. Synthetic fibers are preferable due to the lower levels of lint than that of natural fibers. The synthetic fibers may be polyesters, nylons, polypropylene, and polyurethane.

As shown in FIG. 2, before use, the foldable head 14 is folded along the folding line 20 to place the sampling wipe 18 at the opposite side of the sensor chip 16. During use, one may hold the handle to wipe or touch surfaces contaminated or attached with chemical or biological analytes using the sampling wipe to collect a sample. Folding the sampling wipe at the opposite side of the sensor chip prevents the sensor chip directly contacting the surfaces contaminated or attached with analytes. It reduces the risk of damaging the sensor chip and the surfaces.

As shown in FIG. 3, after using the sampling wipe to collect analytes, the foldable head 14 is folded along the folding line 20 to make the sampling wipe 18 contact the sensor chip 16. A force is applied that squeezes the sampling wipe and sensor chip together to transfer part of analytes from the sampling wipe to the sensor chip. In one embodiment, the sampling wipe comprises a wetting solution. The analytes collected by the sampling wipe may be dissolved in the wetting solution. When squeezing the sampling wipe and sensor chip together, the wetting solution wets the sensor chip to transfer the analytes.

Figure 4A:
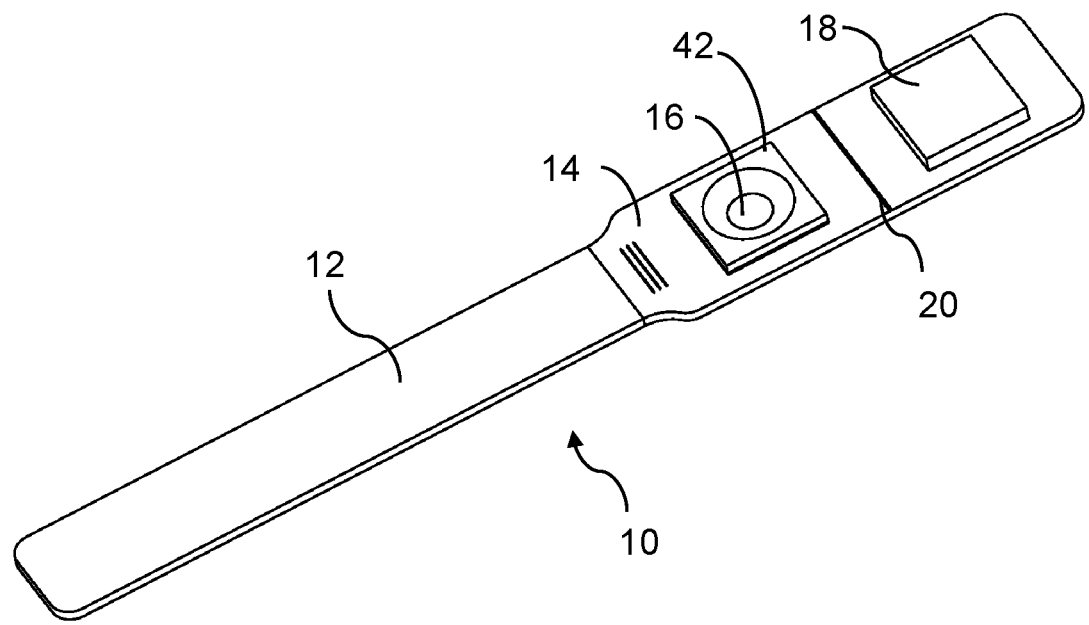
FIG. 4A is a perspective view of a sampling and sensing device having a cap on the sensor chip according to one embodiment of the present disclosure.
Figure 5:
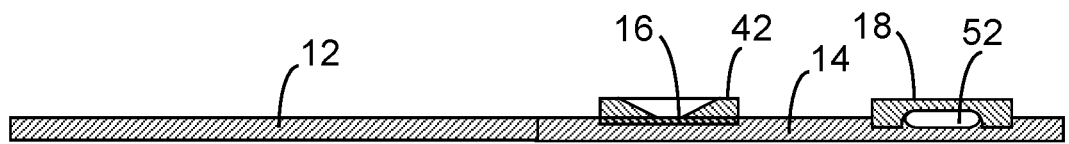
FIG. 5 is a cross-sectional view of the sampling and sensing device shown in FIG. 4A, having a cap covering the sensing chip and a capsule storing a liquid.
Figure 6:
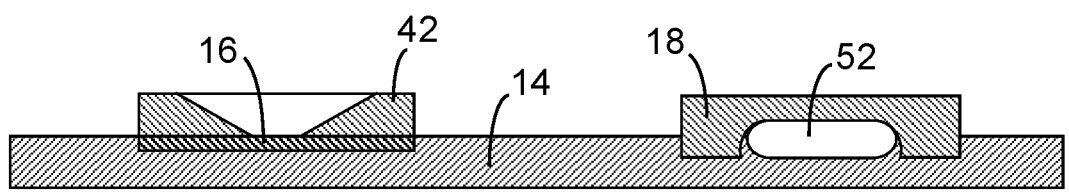
FIG. 6 is a schematic view of an enlarged portion of FIG. 5, showing the foldable head of the sampling and sensing device having a cap and a capsule.

In one embodiment, the sampling and sensing device further includes a cap 42, covering the sensor chip 16. As shown in FIGS. 4-6, the cap 42 includes a through hole with a chamfer at the sidewall of the through hole. When squeezing the wetted sampling wipe and sensor chip together as shown in FIG. 3, the liquid released from the sampling wipe flows from the through hole to the surface of the sensor chip. The cap may prevent the sampling wipe from contacting the sensor chip during the analyte transferring. The cap may be glued on the sensor chip, or one side of the cap in contact with the sensor chip may be sealed, thereby preventing the liquid leaking between the cap and the sensor chip.

Figure 4B:
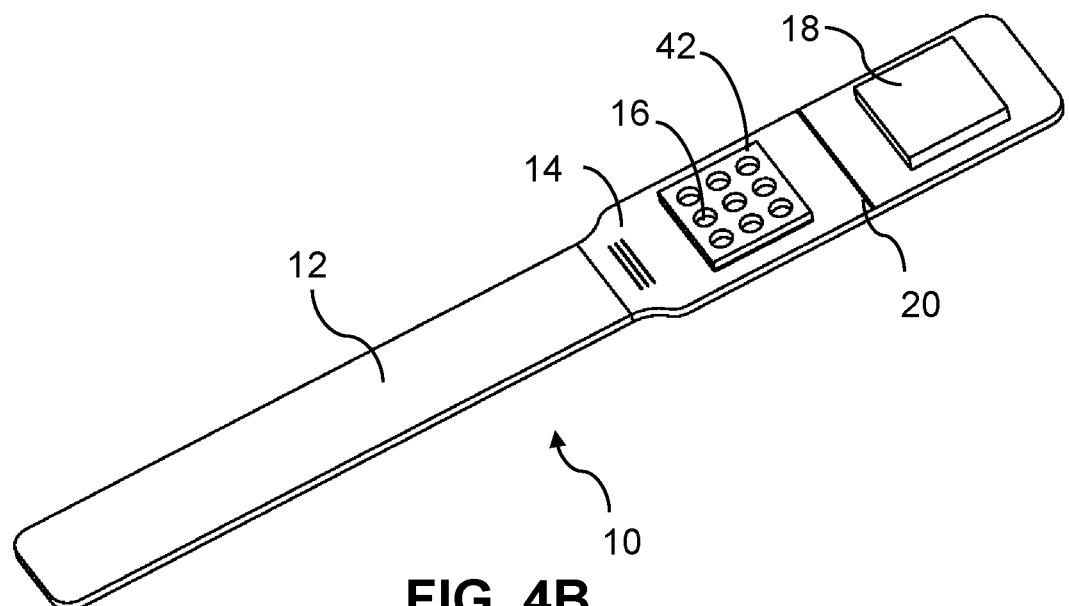
FIG. 4B is a perspective view of a sampling and sensing device having a cap on the sensor chip according to one embodiment of the present disclosure.

In one embodiment, the cap 42 includes a plurality of through holes as shown in FIG. 4B. When squeezing the sampling wipe and sensor chip together, the analytes are transferred into the through holes. Thus, the sensor chip can be divided into multiple cells for identifying or analyzing the analytes separately.

In one embodiment, the sampling and sensing device further includes a capsule 52. As shown in FIGS. 5-6, a capsule 52 is placed under the sampling wipe. The capsule also can be wrapped by the sampling wipe. The capsule 52 has an outer shell and contains a liquid inside the outer shell. An external force can break the capsule 52 to release the liquid to wet the sampling wipe. The external force can be applied to the capsule by squeezing, such as by squeezing the sampling wipe and sensor chip together or by squeezing the sampling wipe and the foldable head. The force can deform the capsule and produce pressure, which causes the capsule to rupture and release the liquid to the sampling wipe.

Figure 7:
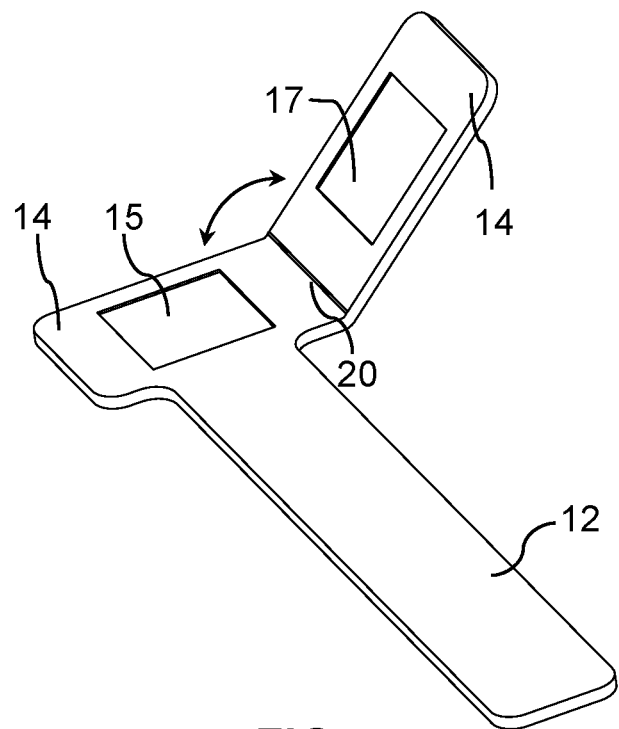
FIG. 7 is a perspective view of a sampling and sensing device having two regions for a sensor chip and a sampling wipe according to one embodiment of the present disclosure.

The position of the handle may vary relative to the folding direction of the foldable head. In one embodiment, as shown in FIG. 7, the handle 12 is positioned along the folding line 20. Therefore, the foldable head can be folded from one side of the handle.

Figure 8:
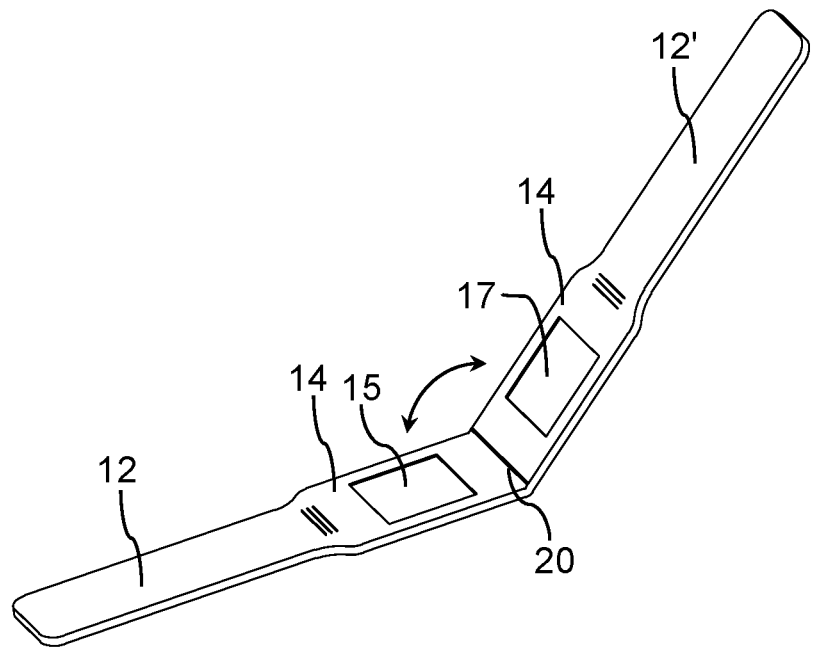
FIG. 8 is a perspective view of a sampling and sensing device having two regions for a sensor chip and a sampling wipe according to one embodiment of the present disclosure.

Another embodiment provides a sampling and sensing device having two handles and a foldable head. As shown in FIG. 8, the sampling and sensing device can be folded along the folding line 20 to make the sampling region and the sensor region face each other or face away from each other. The two handles (a first handle 12 and a second handle 12' as shown in FIG. 8) can be joined together as one handle after the foldable head is folded. The positions of the two handles are mirrored along the folding line 20, but the two handles can be in different sizes and shapes. When collecting analytes, one can fold the sampling and sensing device to make the sampling region and the sensor region face away from each other and then hold the two handles together to wipe a surface. If the material used for the handle is thin or flexible, two handles can improve the stiffness and make them harder to bend. When transferring analytes, one can fold the sampling and sensing device to make the sampling region and the sensor region face each other and then squeeze the handles to facilitate the analyte transferring. The longer the handles, the more leverage and the less force required to squeeze the handles.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A sampling and sensing device, comprising:
a handle and a foldable head, wherein the foldable head has a sensing region and a sampling region;
wherein the sampling and sensing device further includes a sensor chip in the sensing region and a sampling wipe in the sampling region;
the foldable head has a transferring folding direction and a wiping folding direction, the foldable head is folded along the transferring folding direction to place the sensor chip and the sampling wipe in a transferring position, and the foldable head is folded along the wiping folding direction to place the sensor chip and the sampling wipe in a wiping position;
the sensor chip and the sampling wipe are in the transferring position after the foldable head is folded along the transferring folding direction with the sensing region and the sampling region facing each other, the sensor chip and the sampling wipe directly face each other in the transferring position, and the transferring position allows the sensor chip and the sampling wipe to be in direct contact with each other for transferring an analyte collected in the sampling wipe to the sensor chip; and
the sensor chip and the sampling wipe are in the wiping position after the foldable head is folded along the wiping folding direction with the sensing region and the sampling region facing away from each other, the sampling wipe and the sensor chip are located on opposite sides of the foldable head in the wiping position, and the wiping position allows the sampling wipe to wipe or touch surfaces for collecting the analyte.

2. The sampling and sensing device according to claim 1, further comprising a folding line on the foldable head between the sensing region and the sampling region, wherein the foldable head is folded along the folding line to make the sensing region and the sampling region face each other or face away from each other.

3. The sampling and sensing device according to claim 1, wherein the sampling region and the sensing region are on a same side of the foldable head.

4. The sampling and sensing device according to claim 1, wherein the sensor chip is configured to be sensitive to at least a change of physical, chemical, or biological properties.

5. The sampling and sensing device according to claim 1, wherein a capsule containing a liquid is disposed under or in the sampling wipe, configured to be breakable in response to pressure.

6. The sampling and sensing device according to claim 5, wherein the capsule is configured to release the liquid to wet the sampling wipe after the capsule is ruptured.

7. The sampling and sensing device according to claim 1, wherein the sampling wipe is soaked with ethanol, methanol, propanol, or water.

8. The sampling and sensing device according to claim 1, wherein the sensor chip includes a cap covering the sensor chip;
the cap includes a through hole or a plurality of through holes; and
the cap is located between the sensor chip and the sampling wipe after the foldable head is folded with the sensing region and the sampling region facing each other in the transferring position, and the transferring position allows an analyte collected by the sampling wipe to be transferred from the sampling wipe to the sensor chip through the through hole or the plurality of through holes.

9. The sampling and sensing device according to claim 1, further comprising a second handle, wherein the handle and the second handle are joined as one handle after the foldable head is folded.

10. A method of using a sampling and sensing device, wherein the sampling and sensing device comprises a handle and a foldable head, the foldable head has a sensing region and a sampling region, the sampling and sensing device further includes a sensor chip in the sensing region and a sampling wipe in the sampling region; and the method comprises:

holding the handle of the sampling and sensing device and wiping a surface to collect an analyte onto the sampling wipe in the sampling region of the sampling and sensing device, wherein the sensor chip and the sampling wipe are in a wiping position, and the sampling wipe and the sensor chip are located on opposite sides of the foldable head in the wiping position;

folding a portion of the foldable head to make the sampling region in contact with or facing a sensing region, wherein the sensor chip and the sampling wipe are in a transferring position, and the sampling wipe and the sensor chip directly face each other in the transferring position; and applying a force to the sampling and sensing device to release the analyte collected in the sampling region to the sensing region.

11. The method according to claim 10, before holding the handle of the sampling and sensing device and wiping the surface to collect the analyte onto the sampling wipe in the sampling region of the sampling and sensing device, further comprising folding the portion of the foldable head to make the sampling wipe and the sensor chip on opposite sides of the foldable head in the wiping position.

12. The method according to claim 10, before or after holding the handle of the sampling and sensing device and wiping the surface to collect the analyte onto the sampling wipe in the sampling region of the sampling and sensing device, further comprising breaking a capsule in the sampling region and releasing a liquid in the capsule to wet the sampling region.

13. The method according to claim 10, during applying the force to the sampling and sensing device to release the analyte collected in the sampling region to the sensing region, further comprising breaking a capsule in the sampling region and releasing a liquid in the capsule to wet the sampling region.

14. The method according to claim 10, before applying the force to the sampling and sensing device to release the analyte collected on the sampling region to the sensing region, further comprising applying a liquid to the sampling region.

* * * * *